A. T. BROWN.
GEARING.
APPLICATION FILED APR. 30, 1908.

1,104,243.

Patented July 21, 1914.

3 SHEETS—SHEET 1.

Witnesses
Chas H. Young.
S. Davis.

Inventor
Alexander T. Brown
By Parsons Hall Bodell
Attorneys

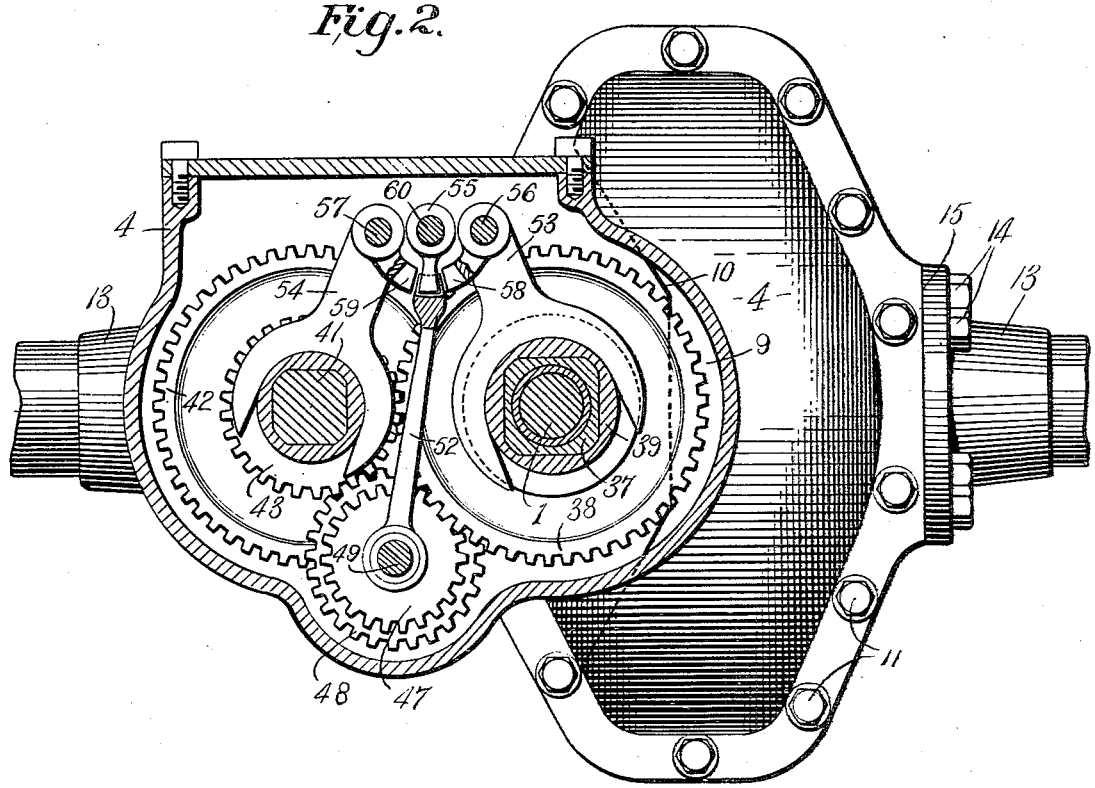

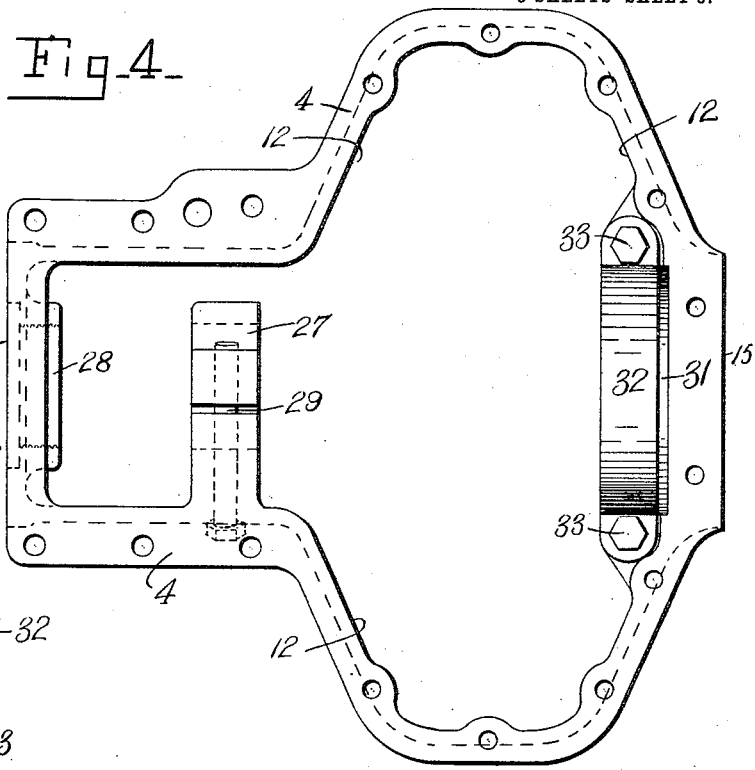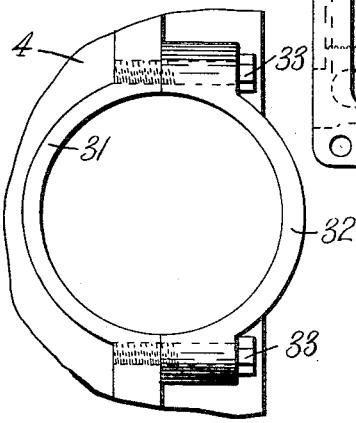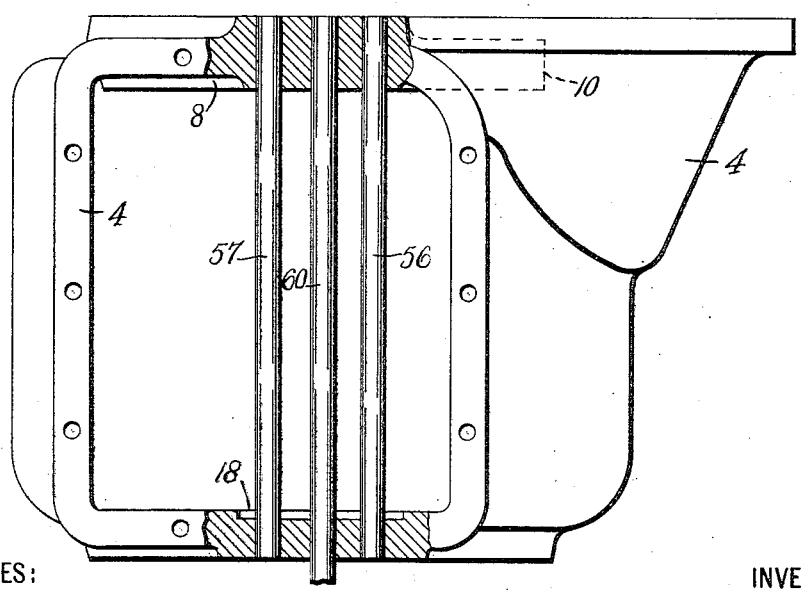

UNITED STATES PATENT OFFICE.

ALEXANDER T. BROWN, OF SYRACUSE, NEW YORK, ASSIGNOR TO THE BROWN-LIPE GEAR COMPANY, OF SYRACUSE, NEW YORK, A CORPORATION OF NEW YORK.

GEARING.

1,104,243.　　　　Specification of Letters Patent.　　Patented July 21, 1914.

Application filed April 30, 1908. Serial No. 430,098.

*To all whom it may concern:*

Be it known that I, ALEXANDER T. BROWN, of Syracuse, in the county of Onondaga and State of New York, have invented a certain new and useful Gearing, of which the following is a specification.

My invention has for its object the production of a gearing particularly applicable for use in self-propelled vehicles, which is highly simple and compact in construction, is especially durable and effective in use, and facilitates ready access to, and removal of, parts thereof; and to this end, the invention consists in the combinations and constructions hereinafter described and pointed out in the claims.

In describing this invention, reference is had to the accompanying drawing, in which like characters designate corresponding parts in all the views.

Figure 1:
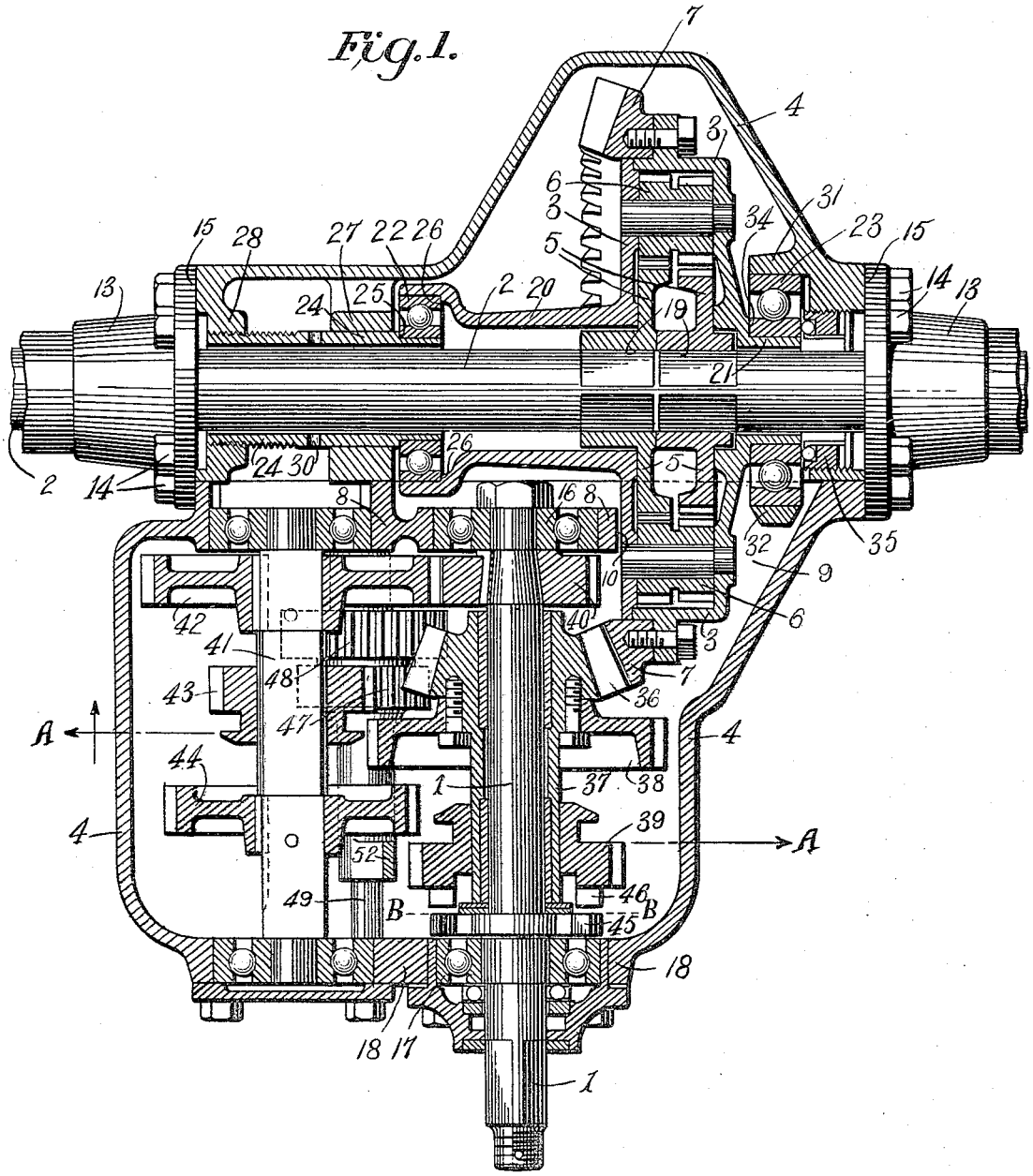
Figure 7:
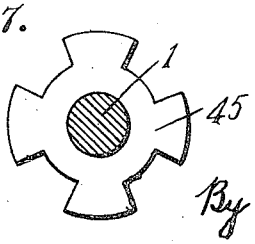

Figure 1 is a sectional view, partly in elevation, of the gearing embodying one form of my invention. Fig. 2 is a sectional view taken on line A—A, Fig. 1. Fig. 3 is a detail sectional view illustrating the intermediate or reverse gears, and parts of the shifting means. Fig. 4 is a face view of one section of the casing. Fig. 5 is a plan view, partly in section, of a portion of another section of the casing, the rods for supporting the shifting means being also shown. Fig. 6 is an inner face view of a part of the section of the casing illustrated in Fig. 4. Fig. 7 is a detail sectional view taken on line B—B, Fig. 1.

My gearing includes, generally, driving and driven members 1 and 2, power-transmitting means for connecting said members, and a suitable support. This support is here shown as a casing inclosing the driving and driven members and the power-transmitting means, but it is obvious that said members and power-transmitting means may be carried by a support not serving to incase the same.

The driving and driven members 1 and 2 are here shown as shafts arranged with their axes at an angle to each other, the driving member 1 being the power-shaft of a self-propelled vehicle and being arranged at one side of the driven member and terminating in close proximity thereto, and the driven member 2 being composed of two sections arranged end to end and capable of movement relatively to each other and connected to a suitable equalizing device including a revoluble member 3 concentric with the driven member 2 and journaled in bearings, presently described, carried by the casing 4, gears 5 mounted on the contiguous ends of the sections of the driven member, and a circular series of suitable pinions 6 carried by the member 3 and coacting with the gears 5. It will, however, be understood by those skilled in the art that the driven member 2 may be continuous from end to end, or may be unprovided with an equalizing device, or may be provided with any other suitable construction of equalizing device, and that the driven and driving members may be arranged otherwise than with their axes at an angle to each other. It will also be understood that the driving member is not necessarily the power-shaft of a self-propelled vehicle, and that the driven member instead of constituting the rear axle of a self-propelled vehicle may consist of any other shaft or revoluble part suitably connected to such a rear axle or to the driving wheels of a self-propelled vehicle, or to any other moving part or mechanism.

Motion is communicated to the driven member 2 by a suitable power-transmitting wheel, as a bevel gear 7, concentric with the driven member and illustrated as fixed to the revoluble member 3 of the equalizing device. In case the driven member 2 is unprovided with an equalizing device, the bevel gear 7 is mounted directly upon such driven member in the same manner as one of the gears 5, or in any other suitable manner.

The casing 4 preferably consists of separable sections, and as here shown said casing is divided in a direction substantially lengthwise of the axis of the driven member 2, opposing surfaces of the sections of the casing being provided with marginal flanges and being arranged between the axis of the driven member 2 and the periphery of the gear 7. Said casing 4 is preferably provided with a partition 8, compartments at opposite sides of the partition, and a passageway 9, the partition 8 being fixed relatively to, and usually formed integral with, the front section of the casing and having opposite sides thereof united to opposing walls of the front section of the casing, as the top and bottom walls thereof, and the passageway 9 being interposed between an edge 10 of the partition 8 and the contiguous inner surface of the external wall of the casing, and connecting the interiors or compartments of the front and rear sections of the casing. Said passageway permits the gear 7 and the equalizing device to extend therethrough from the interior of the rear section of the casing into the interior of the front section thereof. The rear section of the casing 4 is secured to the front section of the casing by any desirable means, as screws 11, passed through the marginal flanges of said sections, and is provided with suitable means for supporting the driven member and the equalizing device, and with an opening 12 in the front face of the section normally closed by the front section of the casing, and formed of greater size than the bevel gear 7 and the equalizing device. Preferably, the rear section of the casing is composed of relatively strong metal, as a forging or a malleable iron or steel casting, and the front section thereof is constructed of relatively light metal, as aluminum, in order that the casing may be of maximum strength and of minimum weight. A casing constructed as described is compact, strong and durable and particularly suitable for use with the remaining parts of my gearing, but it will be understood, by those skilled in the art, that the parts of my gearing may be inclosed in any other suitable sectional casing instead of the one shown and described herein.

In the preferable construction of the casing 4 tubular shells 13 are removably secured by bolts 14, or other suitable means, to flattened faces 15 at opposite sides of said casing. These shells 13 serve to inclose the portions of the driven member projecting beyond the casing 4, but if desired said shells 13 may be dispensed with.

As clearly shown in Fig. 1, the driving member 1 is journaled in bearings 16 and 17 detachably mounted, respectively, in the partition 8 and the opposing wall 18 of the front section of the casing, and the driven member 2 is supported within the rear section of the casing by the gears 5 which engage the circular series of pinions 6. These gears 5 are preferably formed with central openings 19 of angular cross-section, and the contiguous ends of the sections of the driven member 2 are of similar shape so that said sections of the driven member may be moved endwise into and out of operative engagement with the gears 5. The driving and driven members 1 and 2 of my gearing may, however, be otherwise supported by the casing 4.

The illustrated means for supporting the bevel gear 7 and the equalizing device consists of hubs 20 and 21 projecting from opposite sides of the revoluble member 3 of the equalizing device, and antifriction bearings 22 and 23, one bearing being mounted within the hub 20 and the other encircling the hub 21. The bearing 22 encircles one end of a sleeve 24 and is interposed between annular shoulders 25 and 26 spaced apart laterally from each other and provided, respectively, upon the inner face of the hub 20 and the periphery of the contiguous end of the sleeve 24. This sleeve 24 which forms a support for the bearing 22 is passed through and fits circular openings in supporting parts 27 and 28 arranged at the left hand side of the gear 7 and fixed to the interior of the rear section of the casing and having their inner faces arranged concentric with the driven member 2 and spaced apart therefrom. The supporting part 27 is split and provided with a clamping screw 29, Fig. 4, and the inner face of the other supporting part 28 and the contiguous end of the sleeve 24 are threaded and engaged with each other, and said sleeve is provided with means, as sockets 30 for facilitating turning thereof.

As best seen in Fig. 1, the bearing 23 is held in a supporting part or internal hub 31 fixed to the interior of the rear section of the casing at the right hand side of the gear 7 and provided with a detachable segment 32, Fig. 6, secured in position by suitable means, as screws 33. One side of the bearing 23 is engaged with an annular shoulder 34 at the base of the hub 21, and the opposite side of the internal section of said bearing is engaged by a suitable thrust-bearing 35. As the sleeve 24 is adjusted lengthwise of the driven member 2 toward the right, the bevel gear 7 and the antifriction bearings 22 and 23 are moved axially toward the thrust-bearing 35 for adjusting the mesh of the gear 7 with its driving pinion, and when the segment 32 is detached, and the clamping screw 29 is loosened, and the sleeve 24 is moved toward the left out of engagement with the bearing 22, the gear 7 and the equalizing device are free from the supporting parts therefor within the casing.

In the preferable construction of my invention the power-transmitting means for connecting the driving and driven members 1 and 2 includes a transmission wheel, as a bevel gear 36, meshing with the bevel gear 7, and means connecting the driving member 1 and the gear 36 for rotating said gear at different speeds and in opposite directions. It is obvious, however, that a driven member or an equalizing device supported as described may be actuated by a driving gear not rotating at different speeds or in opposite directions. The gear 36 is loosely mounted on the driving member 1 between the partition 8 and the wall 18 of the front section of the casing, and is provided with a sleeve 37 extending toward the wall 18 and usually formed of angular cross-section.

The means for rotating the gear 36 at different speeds and in opposite directions comprises gears 38 and 39 of unequal diameter revoluble with the gear 36, means for locking the driving member 1 to the gear 36, a gear 40 revoluble with the driving member and arranged between the partition 8 and the gear 36, a countershaft 41 having its ends journaled in bearings detachably mounted in the partition 8 and the opposing wall 18 of the front section of the casing, a gear 42 fixed to the countershaft 41 and meshing with the gear 40, gears 43 and 44 of unequal diameter revoluble with said countershaft and adapted to mesh respectively with the gears 38 and 39, an intermediate gear or gears for effecting the reverse or backward movement of the gear 36, and means for moving a number of said gears endwise. Of the gears revoluble with the gear 36, the one 39 of lesser diameter is arranged between the gear 38 and the casing wall 18 and is shiftable endwise along the sleeve 37, and of the gears revoluble with the countershaft and coacting with the gears 38 and 39, the one 43 of lesser diameter is arranged about midway of the countershaft and is shiftable along said countershaft. It is obvious, however, that the gears 38 and 44 may be capable of endwise movement if desired.

The means for locking the driving member 1 to the gear 36 is here shown as coacting clutch-members 45 and 46 fixed respectively to the driving member 1 and the gear 39, but it is apparent that the clutch-member 46 may be carried directly by the sleeve 37 instead of by the gear 39.

In the preferable construction of my gearing, I employ two intermediate gears 47 and 48 for effecting the rotation of the gear 36 in the reverse or backward direction. These gears are of unequal diameter, are revoluble together, are adapted to mesh, respectively, with the gears 38 and 43, and are movable endwise into and out of operative engagement with the gears 38 and 43. Said gears 47 and 48 are mounted on a shaft 49 which is supported at its ends by opposing bearings 50 and 51 carried by the front section of the casing near the base thereof, is movable endwise with the gears 47 and 48, and is provided with a relatively fixed arm 52 extending toward the top of the casing and having its free end provided with suitable engaging means, as jaws spaced apart from each other. The gears 47 and 48 are preferably so arranged relatively to the gears 38 and 43 that the gear 48 meshes with the gear 43 just before the gear 47 meshes with the gear 38. To those skilled in the art, it is apparent that a single intermediate gear may be used instead of two of such gears, and that in such event, it would be necessary to give the single gear twice the movement of the gears 47 and 48.

The means for moving endwise the shiftable gears 39 and 43 and 47 and 48, just described, consists of sliding members 53 and 54, the arm 52 previously described, and a shifting member 55. Said sliding members 53 and 54 are mounted on a pair of fixed rods 56 and 57 spaced apart and supported at the top of the casing 4 by the partition 8 and the opposing wall 18 of the casing. These sliding members 53 and 54 are provided with depending forks respectively engaged with the gears 39 and 43, and opposing surfaces of said members are provided with engaging means, as jaws 58 and 59, the jaws 58 on the member 53 being spaced apart from each other and arranged at one side of the upper end of the arm 52, and the jaws 59 on the other member 54 being spaced apart from each other and the jaws 58 and arranged at the other side of the upper end of the arm 52.

The shifting member 55 is preferably fixed to an actuating rod 60 arranged between the rods 56 and 57 and is movable about its axis and lengthwise thereof. Said member 55 is provided with a depending arm which is arranged in position to coact with the engaging means or jaws of the upper end of the arm 52, or with the engaging means or jaws 58 and 59 of the sliding members 53 and 54, and is movable about the axis of the rod 60 from engagement with the jaws of one of said parts into engagement with the jaws of the predetermined part, and is then movable lengthwise of such axis for shifting said predetermined part. I do not here illustrate any means for moving the rod 60, since any suitable device may be used for this purpose.

In the manufacture of my gearing, the driving member 1, the countershaft 41, the shaft 49 and the rods 56, 57 and 60 are fitted to the front section of the casing, the driven member and the equalizing device are fitted to the rear section of the casing, the sections of the casing are shifted relatively to each other to bring the axes of the driving and driven members into the proper relation relatively to each other, and then the holes for the securing screws 11 are drilled in said sections. The construction of the casing of my gearing thus renders it possible to reduce to a minimum the labor and expense of fitting to said casing the parts carried thereby. Moreover, said casing provides a bearing for the driving member at a minimum distance from the axis of the driven member, and this renders the gearing more compact, and durable than would be the case were said bearing spaced apart a greater distance from the driven member.

In dismantling my gearing the front section of the casing carrying the driving member and the speed-changing means may be removed as a whole from the rear section of the casing, whereupon after the sections of the driven member are detached from the gears 5, and the equalizing device is released, as previously described, from the means supporting the same within the rear section of the casing, said equalizing device and the gear 7 may be withdrawn as a whole through the opening 12 in the front face of said rear section. It is thus apparent that any part of my gearing may be removed with minimum effort.

What I claim, is:—

1. In combination in a transmission and speed-changing gearing, a casing comprising two sections each being provided with a compartment, the casing also being provided with a passageway connecting compartments thereof, a driving member in one compartment, a driven member in another compartment, and transmission and speed-changing means for connecting the driving and driven members and rotating the driven member at different speeds, the same including a gear extending through the passageway, substantially as and for the purpose described.

2. In combination in a gearing, a casing provided with compartments, and a passageway connecting compartments thereof, a driving member in one compartment, a driven member in another compartment, and power-transmitting means connecting the driving and driven members, the same including an equalizing device extending through the passageway, substantially as and for the purpose specified.

3. In combination in a gearing, a casing provided with compartments, and a passageway connecting compartments thereof, a power-shaft in one compartment, axle-sections in another compartment, an equalizing device including a body rotatable about the axis of the axle-sections and extending through the passageway, and gears connecting said body to the axle-sections, and power-transmitting means connecting the power-shaft and said body, substantially as and for the purpose set forth.

4. In combination in a gearing, a casing provided with compartments, a partition interposed between compartments of the casing and united to opposite sides of the casing, and a passageway between the edge of the partition and the opposing surface of the casing, said passageway connecting compartments of the casing, a driving member in one compartment, a driven member in another compartment, and power-transmission means connecting the driving and driven members and including a gear extending through the passageway, substantially as and for the purpose described.

5. In combination in a transmission and speed-changing gearing, a casing provided with compartments, a partition between compartments of the casing, and a passageway connecting compartments of the casing, a driving member in one compartment, a driven member in another compartment, and transmission and speed-changing means for connecting the driving and driven members, the same including a countershaft having one end supported by the partition, and a gear extending through the passageway, substantially as and for the purpose specified.

6. In combination in a transmission and speed-changing gearing, a casing provided with compartments, a partition between compartments of the casing, and a passageway connecting compartments of the casing, a driving member in one compartment, a driven member in another compartment such member including sections, an equalizing device connecting the sections of the driven member, said device extending through the passageway, and transmission and speed-changing means for connecting the driving member and the equalizing device, the same including a countershaft having one end supported by the partition, and its other end supported by an opposing wall of the casing, and a gear extending through the passageway, substantially as and for the purpose set forth.

7. In a transmission and speed-changing gearing, a driving member, a driven member, transmission and speed-changing gears for connecting the driving and driven members and rotating the driven member at different speeds, and a casing comprising separable sections, one carrying the driving member and speed-changing gears, and another carrying the driven member, substantially as and for the purpose described.

8. In a transmission and speed-changing gearing, a driving member, a driven member including sections, an equalizing device connecting the sections of the driven member, transmission and speed-changing gears for connecting the driving member and the equalizing device, and a casing comprising separable sections, one carrying the driving member and speed-changing gears, and another carrying the driven member and the equalizing device, substantially as and for the purpose specified.

9. In a transmission and speed-changing gearing, a driving member, a driven member, transmission and speed-changing gears for connecting the driving and driven members and rotating the driven member at different speeds, and a casing comprising separable sections and provided with a passageway connecting the interiors of sections thereof, one of the transmission gears being arranged within one section, and another of the transmission gears extending through said passageway, and one of the sections of the casing carrying the driving member and speed-changing gears, and another of said sections carrying the driven member, substantially as and for the purpose set forth.

10. In a transmission and speed-changing gearing, a driving member, a driven member including sections, an equalizing device connecting the sections of the driven member, transmission and speed-changing gears for connecting the driving member and the equalizing device, and a casing comprising separable sections and provided with a passageway connecting the interiors of sections thereof, one of the transmission gears being arranged within one section, and another of the transmission gears extending through said passageway, and one of the sections of the casing carrying the driving member and the speed-changing gears, and another carrying the driven member and the equalizing device, substantially as and for the purpose specified.

11. In combination in a transmission and speed-changing gearing, a driving member, a driven member, transmission and speed-changing gears for connecting the driving and driven members and rotating the driven member at different speeds, and a casing comprising separable sections and provided with a partition and with a passageway connecting the interiors of sections of the casing, the partition forming a part of one of the sections of the casing and being removable therewith from another section of the casing, one of the transmission gears being arranged within one section of the casing, and another of the transmission gears extending through said passageway, and one of the sections of the casing carrying the driving member and speed-changing gears, and another of said sections carrying the driven member, said driving member having a part thereof supported by the partition, substantially as and for the purpose set forth.

12. In combination in a transmission and speed-changing gearing, a driving member, a driven member including sections, an equalizing device connecting the sections of the driven member, transmission and speed-changing gears for connecting the driving member and the equalizing device, and a casing comprising separable sections and provided with a partition and with a passageway connecting the interiors of sections of the casing, the partition forming a part of one of the sections of the casing and being removable therewith from another section of the casing, one of the transmission gears being arranged within one section of the casing, and another of the transmission gears extending through said passageway, and one of the sections of the casing carrying the driving member and speed-changing gears, and another of said sections carrying the driven member and the equalizing device, said driving member having a part thereof supported by the partition, substantially as and for the purpose described.

13. In combination in a transmission and speed-changing gearing, a driving member, a driven member, transmission and speed-changing gears for connecting the driving and driven members and rotating the driven member at different speeds, a countershaft for supporting a number of said gears, and a casing comprising separable sections and provided with a partition and with a passageway connecting the interiors of sections of the casing, the partition forming a part of one of the sections of the casing and being removable therewith from another section of the casing, one of the transmission gears being arranged within one section of the casing, and another of the transmission gears extending through said passageway, and one of the sections of the casing carrying the driving member, speed-changing gears, and the countershaft, and another of said sections carrying the driven member, said driving member and countershaft having parts thereof supported by the partition, substantially as and for the purpose specified.

14. In combination in a transmission and speed-changing gearing, a driving member, a driven member including sections, an equalizing device connecting the sections of the driven member, transmission and speed-changing gears for connecting the driving member and the equalizing device, a countershaft for supporting a number of said gears, and a casing comprising separable sections and provided with a partition and with a passageway connecting the interiors of sections of said casing, the partition forming a part of one of the sections of the casing and being removable therewith from another section of the casing, one of the transmission gears being arranged within one section of the casing, and another of the transmission gears and the equalizing device extending through said passageway, and one of the sections of the casing carrying the driving member, the speed-changing gears and the countershaft, and another of said sections carrying the driven member and the equalizing device, said driving member and countershaft having parts thereof supported by the partition, substantially as and for the purpose set forth.

15. In combination in a gearing, a driving member, a driven member, means for connecting the driving and driven members and rotating the driven member, said means including a gear concentric with the driven member, a casing divided in a direction substantially lengthwise of the axis of the driven member, opposing surfaces of the sections of the casing being located in a vertical plane extending between the axis of the driven member and the periphery of the gear concentric therewith, and power transmitting means in the sections substantially as and for the purpose described.

16. In combination in a transmission and speed-changing gearing, a driving member, a driven member, transmission and speed-changing gears for connecting the driving and driven members and rotating the driven member at different speeds, said gears including a bevel gear concentric with the driven member, and a casing divided in a direction substantially lengthwise of the axis of the driven member, opposing surfaces of the sections of the casing being located in a vertical plane extending between said axis and the periphery of the bevel gear, one of the sections of the casing carrying the driving member and speed-changing gears, and another of said sections carrying the driven member, substantially as and for the purpose specified.

17. In combination in a transmission and speed-changing gearing, a driving member, a driven member including sections, an equalizing device connecting the sections of the driven member, transmission and speed-changing gears for connecting the driving member and the equalizing device, said gears including a bevel gear concentric with the driven member, and a casing divided in a direction substantially lengthwise of the axis of the driven member, opposing surfaces of the sections of the casing being located in a vertical plane extending between said axis and the periphery of the bevel gear, one of the sections of the casing carrying the driving member and speed-changing gears, and another of said sections carrying the driven member and the equalizing device, substantially as and for the purpose set forth.

18. In combination in a transmission and speed-changing gearing, a driving member, a driven member, transmission and speed-changing gears for connecting the driving and driven members and rotating the driven member at different speeds, one of such gears being concentric with the driven member, and a casing divided in a direction substantially lengthwise of the axis of the driven member, opposing surfaces of the sections of the casing being located in a vertical plane extending between the axis of the driven member and the periphery of said gear concentric therewith, said casing being provided with a passageway connecting the interiors of sections thereof, and said gear concentric with the driven member extending through the passageway from the interior of one section of the casing into the interior of another section thereof, one of the sections of the casing carrying the driving member and speed-changing gears, and another of said sections carrying the driven member, substantially as and for the purpose described.

19. In combination in a transmission and speed-changing gearing, a driving member, a driven member including sections, an equalizing device connecting the sections of the driven member, transmission and speed-changing gears for connecting the driving member and the equalizing device, said gears including a bevel gear concentric with the driven member, and a casing divided in a direction substantially lengthwise of the axis of the driven member, opposing surfaces of the sections of the casing being located in a vertical plane extending between said axis and the periphery of the bevel gear, said casing being provided with a passageway connecting the interiors of sections thereof, and said bevel gear extending through the passageway from the interior of one section of the casing into the interior of another section thereof, one of the sections of the casing carrying the driving member and the speed-changing gears, and another of said sections carrying the driven member and the equalizing device, substantially as and for the purpose specified.

20. In combination in a transmission and speed-changing gearing, a driving member, a driven member including sections, an equalizing device connecting the sections of the driven member, transmission and speed-changing gears for connecting the driving member and the equalizing device, one of such gears being concentric with the driven member, and a casing divided in a direction substantially lengthwise of the axis of the driven member, opposing surfaces of the sections of the casing being located in a vertical plane extending between the axis of the driven member and the periphery of said gear concentric therewith, said casing being provided with a passageway connecting the interiors of sections thereof, and said gear concentric with the driven member, and the equalizing device extending through the passageway, and another of said gears being arranged within one section of the casing and coacting with the gear extending through said passageway, one of the sections of the casing carrying the driving member and the speed-changing gears, and another of said sections carrying the driven member and the equalizing device, substantially as and for the purpose set forth.

21. In combination in a transmission and speed-changing gearing, a driving member, a driven member including sections, an equalizing device connecting the sections of the driven member, transmission and speed-changing gears for connecting the driving member and the equalizing device, said gears including a pair of coacting bevel gears, one of the bevel gears being concentric with the driven member, a countershaft for supporting a number of said gears, and a casing divided in a direction substantially lengthwise of the axis of the driven member, opposing surfaces of the sections of the casing being located in a plane extending between said axis and the periphery of the bevel gear concentric with the driven member, said casing being provided with a partition and with a passageway connecting the interiors of said sections of the casing, the partition forming a part of one of the sections of the casing and being removable therewith from another section of the casing, said bevel gear concentric with the driven member, and the equalizing device extending through the passageway, and the other bevel gear being arranged within one section of the casing, one of the sections of the casing carrying the driving member, the speed-changing gears and the countershaft, and another of said sections carrying the driven member and the equalizing device, said driving member and countershaft having parts thereof supported by the partition, substantially as and for the purpose described.

22. In combination, in a gearing, compensating mechanism, driven shaft sections associated therewith, a driving member for co-operating with a part of the compensating mechanism, a case-section housing portions of the compensating mechanism and the driven shaft sections and having an opening in one side thereof, means for supporting the compensating mechanism in the case-section and permitting the removal thereof through said opening, a second case-section for covering the opening in the first-named case-section and for housing the driving member, and means for supporting the driving member carried by said second section and removable therefrom.

23. In combination in a transmission and speed-changing gearing, a driving member, a driven member, transmission and speed-changing gears for connecting the driving and driven members and rotating the driven member at different speeds, one of such gears being concentric with the driven member, a countershaft for supporting a number of said gears, a casing comprising separable sections and provided with a passageway connecting the interiors of sections thereof, said gear concentric with the driven member extending through such passageway, bearings for the driving member and the countershaft detachably supported by one section of the casing, and means for supporting the driven member detachably supported by another of said sections, substantially as and for the purpose described.

24. In combination in a transmission and speed-changing gearing, a driving member, a driven member including sections, an equalizing device connecting the sections of the driven member, transmission and speed-changing gears for connecting the driving member and the equalizing device, one of such gears being concentric with the driven member, a countershaft for supporting a number of said gears, a casing divided in a direction substantially lengthwise of the axis of the driven member, opposing surfaces of the sections of the casing being located in a plane extending between the axis of the driven member and the periphery of the gear concentric therewith, one of the sections of the casing being provided with a partition, bearings for the driving member and the countershaft detachably supported by the partition and the opposing wall of the section provided therewith, and means for supporting the driven member and the equalizing device detachably supported by another section of the casing, substantially as and for the purpose set forth.

25. In a gearing, a driving member, a driven member including sections, an equalizing device connecting the sections of the driven member, said sections being detachable from the equalizing device, means for connecting the driving member and the equalizing device, and a casing comprising a section separable from a portion of the casing, said section carrying the driven member and being provided with supports for the equalizing device, said device being detachable from such supports, and the face of said section of the casing opposed to the contiguous separable portion of the casing being provided with an opening of greater size than the equalizing device for permitting the removal of said device as a whole from the section of the casing carrying the same, substantially as and for the purpose described.

26. In a gearing, a driving member, a driven member including sections, an equalizing device connecting the sections of the driven member, said sections being detachable from the equalizing device, means for connecting the driving member and the equalizing device, and a casing comprising separable sections, one carrying the driving member, and another carrying the driven member and being provided with means for supporting the equalizing device and permitting the removal thereof as a whole from the face of said section opposed to the section carrying the driving member, substantially as and for the purpose specified.

27. In a gearing, a driving member, a driven member including sections, an equalizing device connecting the sections of the driven member, said sections being removable endwise from the equalizing device, means for connecting the driving member and the equalizing device, and a casing comprising separable sections, one carrying the driving member, and another carrying the driven member and being provided with means for supporting the equalizing device and permitting the detachment of such device from said means, the section of the casing carrying the driven member and supporting the equalizing device having its face opposed to the section of the casing carrying the driving member formed with an opening of greater size than the equalizing device for permitting the removal of said device as a whole through such opening when the section of the casing carrying the driving member is removed, substantially as and for the purpose set forth.

28. In a gearing, a driving member, a driven member, means for connecting the driving and driven members including a gear concentric with the driven member, the driven member being detachable from such gear, and a casing comprising a section separable from a portion of the casing, said section carrying the driven member, and the face of said section opposed to the contiguous separable portion of the casing being provided with an opening of greater size than the gear concentric with the driven member for permitting the removal of said gear from the section of the casing carrying the driven member and means located in the separable section of the casing for coacting with said gear, substantially as and for the purpose described.

29. In a gearing, a driving member, a driven member including sections, an equalizing device connecting the sections of the driven member, said sections being detachable from the equalizing device, means for connecting the driving member and the equalizing device, and a casing comprising a section separable from a portion of the casing, said section carrying the driven member and being provided with supports for the equalizing device, the supports being spaced apart and arranged concentric with the driven member, and one of such supports being movable lengthwise of the driven member relatively to the other support for permitting detachment of the equalizing device from said supports, and the face of said section of the casing opposed to the contiguous separable portion of the casing being provided with an opening of greater size than the equalizing device for permitting the removal of said device as a whole from the section of the casing carrying the same, substantially as and for the purpose specified.

30. In a gearing, a driving member, a driven member including sections, an equalizing device connecting the sections of the driven member, said sections being detachable from the equalizing device, means for connecting the driving member and the equalizing device, and a casing comprising a section separable from a portion of the casing, said section carrying the driven member and being provided with supports for the equalizing device, the supports being spaced apart and arranged concentric with the driven member, and one of such supports having a detachable segment, and the other support being movable lengthwise of the driven member for permitting the detachment of the equalizing device from said supports, and the face of said section of the casing opposed to the contiguous separable portion of the casing being provided with an opening of greater size than the equalizing device for permitting the removal of said device as a whole from the section of the casing carrying the same, substantially as and for the purpose set forth.

31. In a gearing, a driving member, a driven member including sections, an equalizing device connecting the sections of the driven member, said sections being removable endwise from the equalizing device, means for connecting the driving member and the equalizing device, and a casing comprising separable sections, one carrying the driving member, and another carying the driven member and being provided with supports for the equalizing device, the supports being spaced apart and arranged concentric with the driven member, and one of such supports having a detachable segment, and the other support being movable lengthwise of the driven member for permitting the detachment of the equalizing device from said supports, the section of the casing carrying the driven member and supporting the equalizing device having its face opposed to the section of the casing carrying the driving member formed with an opening of greater size than the equalizing device for permitting the removal of said device as a whole through such opening when the section of the casing carrying the driving member is removed, substantially as and for the purpose described.

32. In a gearing, a driving member, a driven member, means for connecting the driving and driven members including a gear concentric with the driven member, the driven member being detachable from such gear, and a casing divided in a direction substantially lengthwise of the axis of the driven member, opposing surfaces of sections of the casing being located in a plane extending between the axis of the driven member and the periphery of the gear concentric therewith, one of the sections of the casing carrying the driving member, and another of said sections carrying the driven member and the gear concentric therewith, the last-mentioned section having an opening normally closed by the section of the casing carrying the driving member for permitting the removal of said gear through such opening when the section of the casing carrying the driving member is removed, substantially as and for the purpose specified.

33. In combination in a transmission and speed-changing gearing, a driving member, a driven member, transmission and speed-changing gears for connecting the driving and driven members including a gear concentric with the driven member, the driven member being detachable from such gear, and a casing divided in a direction substantially lengthwise of the axis of the driven member, opposing surfaces of sections of casing being located in a plane extending between the axis of the driven member and the periphery of the gear concentric therewith, one of the sections of the casing carrying the driving member and speed-changing gears, and another of said sections carrying the driven member and the gear concentric therewith, the last-mentioned section having an opening normally closed by the section of the casing carrying the driving member and speed-changing gears for permitting the removal of the gear concentric with the driven member through said opening when the section of the casing carrying the driving member is removed, substantially as and for the purpose set forth.

34. In a gearing, the combination of a driving member, a driven member, a member concentric with the driven member and having an internal concentric bearing surface, a casing for the driving and driven members and the member concentric with the driven member, the casing having a supporting part arranged at one side of the member concentric with the driven member and encircling said driven member and spaced apart therefrom, the inner face of the supporting part being threaded, a bearing for the member concentric with the driven member, the same being arranged within such concentric surface, the member concentric with the driven member and the bearing being movable axially together, a support for the bearing, said support encircling the driven member and being spaced apart therefrom and having one end connected to said bearing and its other end threaded and engaged with the threaded inner face of said supporting part, the support being adjustable lengthwise of the driven member for moving the member concentric with the driven member and the bearing axially, and means within the casing for connecting the driven member and the member concentric with the driven member, substantially as and for the purpose described.

35. In a gearing, the combination of a driving member, a driven member including sections, an equalizing device connecting the sections of the driven member and comprising a member concentric with the driven member and provided with a laterally extending hub having an internal annular shoulder, a casing for the driving and driven members and the equalizing device having a supporting part arranged at one side of said hub and encircling the driven member and spaced apart therefrom, the inner face of the supporting part being threaded, a sleeve encircling the driven member and spaced apart therefrom, one end of the sleeve projecting into the laterally extending hub and being provided with an annular shoulder spaced apart laterally from the first-mentioned shoulder, and the other end of the sleeve extending beyond said hub and being threaded and engaged with the threaded inner face of said supporting part, an antifriction bearing between the inner face of the hub and the periphery of the contiguous end of the sleeve, the bearing being engaged with said annular shoulders, and the sleeve being movable lengthwise of the driven member for moving the equalizing device and the bearing axially, and means within the casing for connecting the driving member and the equalizing device, substantially as and for the purpose set forth.

36. In a gearing, the combination of a driving member, a driven member including sections, an equalizing device connecting the sections of the driven member and comprising a member concentric with the driven member, means for moving the equalizing device lengthwise of the driven member, means for supporting the equalizing device including an antifriction bearing movable lengthwise of the driven member with the equalizing device, a thrust-bearing engaging a part of said antifriction bearing, and means for connecting the driving member and the equalizing device, substantially as and for the purpose set forth.

37. In a gearing, the combination of a driving member, a driven member including sections, an equalizing device connecting the sections of the driven member and comprising a member concentric with the driven member and provided with a laterally extending hub, a casing for the driving and driven members and the equalizing device having a support for the equalizing device, the support encircling said hub and being spaced apart therefrom and provided with a removable segment, means for moving the equalizing device lengthwise of the driven member, an antifriction bearing between the periphery of the hub and the inner face of said support, the bearing being movable lengthwise of the driven member with the equalizing device, a thrust-bearing engaging a part of said antifriction bearing, and means for connecting the driving member and the equalizing device, substantially as and for the purpose described.

38. In a gearing, the combination of a driving member, a driven member including sections, an equalizing device connecting the sections of the driven member and comprising a member concentric with the driven member and provided with laterally extending hubs at opposite sides thereof, bearings for said member, one being arranged within one of the hubs and the other encircling the other hub, said equalizing device and bearings being movable axially together, a support for the bearing arranged within one of the hubs, the support being adjustable lengthwise of the driven member for moving the equalizing device and the bearings axially, a support for the other bearing, and means for connecting the driving member and the equalizing device, substantially as and for the purpose specified.

39. In a gearing, the combination of a driving member, a driven member including sections, an equalizing device connecting the sections of the driven member and comprising a member concentric with the driven member and provided with laterally extending hubs at opposite sides thereof, antifriction bearings for said member, one being arranged within one of the hubs and the other encircling the other hub, said equalizing device and bearings being movable axially together, a sleeve encircling the driven member and supporting the antifriction bearing arranged within one of the hubs, the sleeve being adjustable lengthwise of the driven member for moving the equalizing device and the bearings axially, a thrust-bearing engaging a part of the other antifriction bearing, means for connecting the driving member and the equalizing device, and means for supporting the sleeve, the antifriction bearing encircling one of the hubs, and the thrust-bearing, substantially as and for the purpose described.

40. In a gearing, a driving member, a driven member, means for connecting the driving and driven members including a gear concentric with the driven member, the driven member being detachable from such gear, and a casing comprising a section separable from a portion of the casing, said section being provided with supports for the gear, one of such supports being adjustable relatively to the other for permitting the detachment of the gear from said supports, and the face of said section opposed to the contiguous separable portion of the casing being provided with an opening of greater size than said gear for permitting the removal of the gear from the section of the casing provided with said supports, substantially as and for the purpose specified.

41. In combination in a transmission and speed-changing gearing, driving and driven members arranged with their axes at an angle to each other, a gear concentric with the driving member and connected to the driven member, a second gear concentric with the driving member and arranged between the axis of the driven member and the first-mentioned gear, and means for connecting said gears, substantially as and for the purpose set forth.

42. In combination in a transmission and speed-changing gearing, driving and driven members arranged with their axes at an angle to each other, a gear loosely mounted on the driving member and connected to the driven member, a second gear fixed to the driving member and arranged between the axis of the driven member and the first-mentioned gear, and means for connecting said gears, substantially as and for the purpose described.

43. In combination in a transmission and speed-changing gearing, driving and driven members arranged with their axes at an angle to each other, a gear loosely mounted on the driving member and connected to the driven member, means for locking the gear to the driving member, a second gear fixed to the driving member and arranged between the axis of the driven member and the first-mentioned gear, and means for connecting said gears, substantially as and for the purpose specified.

44. In combination in a transmission and speed-changing gearing, driving and driven members arranged with their axes at an angle to each other, a bevel gear concentric with the driven member, a second bevel gear concentric with the driving member and coacting with the first-mentioned bevel gear, the driving member having revoluble movement independently of the second-mentioned bevel gear, and speed-changing means between the driving member and the second-mentioned gear, the same including a gear revoluble with the driving member and arranged between the axis of the driven member and said second-mentioned bevel gear, substantially as and for the purpose set forth.

45. In combination in a transmission and speed-changing gearing, driving and driven members arranged with their axes at an angle to each other, a casing comprising separable sections and provided with a partition and with a passageway connecting the interiors of sections of the casing, the partition forming a part of one of the sections of the casing and being removable therewith from another section of the casing, said partition and the opposing wall of the section of the casing removable therewith being provided with bearings for the driving member, and another section of the casing being provided with means for supporting the driven member, a gear loosely mounted on the driving member, means for locking the gear to the driving member, means for connecting the gear to the driven member including a gear extending through the passageway, a gear fixed to the driving member and arranged between the partition and the first-mentioned gear, and means for connecting the last-mentioned gear to the first-mentioned gear, said means being carried by the section of the casing provided with bearings for the driving member, substantially as and for the purpose described.

46. In combination in a transmission and speed-changing gearing, driving and driven members arranged with their axes at an angle to each other, a gear connected to the driven member for rotating the same, a power-shaft having one end extended through the gear and projecting beyond the same, said shaft having revoluble movement independently of the gear, and speed-changing means between the driving member and the first-mentioned gear for rotating said gear at different speeds, such means including a gear fixed to the end of the power-shaft projecting beyond the first-mentioned gear, substantially as and for the purpose specified.

47. In combination in a transmission and speed-changing gearing, a casing comprising separable sections and provided with a partition and with a passageway connecting the interiors of sections of the casing, the partition forming a part of one of the sections of the casing and being removable therewith from another section of the casing, a driven member supported in a section of the casing unprovided with the partition, a gear concentric with the driven member and extending through the passageway, a second gear arranged in the section of the casing provided with the partition, and coacting with the first-mentioned gear, a power-shaft extending through the second-mentioned gear and journaled at opposite sides thereof in the partition and the opposing wall of the section of the casing provided with the partition, said shaft having revoluble movement independently of the second-mentioned gear, means for locking the second-mentioned gear to the power-shaft, and speed-changing means between the driving member and the second-mentioned gear for rotating said gear at different speeds, such means including a gear fixed to the power-shaft and arranged between the second-mentioned gear and the partition, substantially as and for the purpose set forth.

48. In combination in a transmission and speed-changing gearing, driving and driven members arranged with their axes at an angle to each other, a gear loosely mounted on the driving member and connected to the driven member, means for locking the gear to the driving member, a second gear revoluble with the first-mentioned gear, a third gear revoluble with the driving member and arranged between the axis of the driven member and the first-mentioned gear, and means for connecting the third-mentioned gear to the second-mentioned gear, substantially as and for the purpose described.

49. In combination in a transmission and speed-changing gearing, driving and driven members arranged with their axes at an angle to each other, a gear loosely mounted on the driving member and connected to the driven member, said gear being provided with a sleeve, a second gear revoluble with the sleeve and movable lengthwise thereof, a third gear revoluble with the driving member and arranged between the axis of the driven member and the first-mentioned gear, and means for connecting the third-mentioned gear to the second - mentioned gear, substantially as and for the purpose specified.

50. In combination in a transmission and speed-changing gearing, driving and driven members arranged with their axes at an angle to each other, a gear loosely mounted on the driving member and connected to the driven member, said gear being provided with a sleeve, a second gear revoluble with the sleeve and movable lengthwise thereof, a third gear revoluble with the first-mentioned gear, a fourth gear revoluble with the driving member and arranged between the axis of the driven member and the first-mentioned gear, and power-transmitting means for connecting the fourth-mentioned gear to the second-mentioned and third-mentioned gears, substantially as and for the purpose set forth.

51. In combination in a transmission and speed-changing gearing, driving and driven members arranged with their axes at an angle to each other, a gear loosely mounted on the driving member and connected to the driven member, said gear being provided with a sleeve, a second gear revoluble with the sleeve and movable lengthwise thereof, coacting clutch-members respectively fixed to the driving member and the sleeve, a third gear revoluble with the driving member and arranged between the axis of the driven member and the first-mentioned gear, and means for connecting the third-mentioned gear to the second-mentioned gear, substantially as and for the purpose described.

52. In combination in a transmission and speed-changing gearing, a casing comprising separable sections and provided with a partition and with a passageway connecting the interiors of sections of the casing, the partition forming a part of one of the sections of the casing and being removable therewith from another section of the casing, a driven member supported in a section of the casing unprovided with the partition, a gear concentric with the driven member and extending through the passageway, a second gear arranged in the section of the casing provided with the partition, said gear coacting with the first-mentioned gear and being provided with a sleeve, a power-shaft extending through the second-mentioned gear and journaled at opposite sides thereof in the partition and the opposing wall of the section of the casing provided with the partition, said shaft having revoluble movement independently of the second-mentioned gear, a third gear revoluble with the second-mentioned gear, a fourth gear revoluble with the sleeve and movable lengthwise thereof, coacting clutch-members respectively fixed to the power-shaft and the fourth-mentioned gear, a fifth gear revoluble with the driving member and arranged between the second-mentioned gear and the partition, and means for connecting the fifth-mentioned gear to the third and fourth-mentioned gears, substantially as and for the purpose specified.

53. In combination in a transmission and speed-changing gearing, driving and driven members arranged with their axes at an angle to each other, and transmission and speed-changing means for connecting the driving and driven members and rotating the driven member at different speeds, the same comprising a gear concentric with the driving member, a countershaft, and a gear connected to the countershaft, said gear being concentric with the driving member and revoluble therewith and being arranged between the axis of the driven member and the first-mentioned gear, substantially as and for the purpose set forth.

54. In combination in a transmission and speed-changing gearing, driving and driven members arranged with their axes at an angle to each other, a casing comprising separable sections and provided with a partition forming a part of one of the sections of the casing and being removable therewith from another section of the casing, said partition and the opposing wall of the section of the casing removable therewith being provided with bearings for the driving member, and another section of the casing being provided with means for supporting the driven member, a gear loosely mounted on the driving member, means for connecting the gear to the driven member, a countershaft having its ends journaled in the partition and the opposing wall of the section of the casing provided with the partition, a second gear fixed to the driving member and arranged between the partition and the first-mentioned gear, said second gear being connected to the countershaft, and change-speed gears for connecting the countershaft to the first-mentioned gear, part of the change-speed gears being mounted on the driving member and part thereof being mounted on the countershaft, substantially as and for the purpose described.

55. In combination in a transmission and speed changing gearing, a plurality of power transmitting parts movable about different axes extending parallel to each other and shiftable lengthwise of said axes, shifters associated with said parts respectively, parallel guides along which the shifters are movable respectively, and the shifters having arms thereon converging toward a point and arranged with their ends in an arc extending crosswise of the axis of the guides, and means for selecting and actuating the shifters, said means being arranged at the center of said arc and movable about the axis of said arc to select a predetermined shifter and lengthwise of said axis located at the center of the arc, substantially as and for the purpose described.

56. In combination in a transmission and speed-changing gearing, a casing comprising separable sections and provided with a partition and with a passageway connecting the interiors of sections of the casing, the partition forming a part of one of the sections of the casing and being removable therewith from another section of the casing, a driven member supported by the section of the casing unprovided with the partition, a gear concentric with the driven member and extending through the passageway, a second gear arranged in the section of the casing provided with the partition, said gear coacting with the first-mentioned gear and being provided with a sleeve, a power-shaft extending through the second-mentioned gear and journaled at opposite sides thereof in the partition and the opposing wall of the section of the casing provided with the partition, said shaft having revoluble movement independently of the second-mentioned gear, a countershaft having its ends journaled in the partition and the opposing wall of the section of the casing provided with the partition, a third gear revoluble with the second-mentioned gear, a fourth gear revoluble with the sleeve and movable lengthwise thereof, coacting clutch-members respectively fixed to the power-shaft and the fourth-mentioned gear, a fifth gear revoluble with the driving member and arranged between the second-mentioned gear and the partition, said fifth gear being connected to the countershaft, and a plurality of gears mounted on the countershaft and connected to the third and fourth-mentioned gears, one of said plurality of gears being fixed to the countershaft and another slidable lengthwise thereof, substantially as and for the purpose specified.

57. In combination in a transmission and speed-changing gearing, driving and driven members arranged with their axes at an angle to each other, a casing comprising separable sections and provided with a partition forming a part of one of the sections of the casing and being removable therewith from another section of the casing, said partition and the opposing wall of the section of the casing removable therewith being provided with bearings for the driving member, and another section of the casing being provided with means for supporting the driven member, a rod supported by the partition and the opposing wall of the section of the casing provided with the partition, a gear connected to the driven member for rotating the same, and means for connecting the driving member to the gear and rotating the gear at different speeds, said means including a gear movable endwise, a sliding member for moving the last-mentioned gear endwise, and a member mounted on the rod and movable about an axis into and out of position to coact with the sliding member and movable along said axis for shifting the sliding member, substantially as and for the purpose described.

58. In combination in a transmission and speed-changing gearing, driving and driven members, a gear connected to the driven member for rotating the same, and means for connecting the driving member to the gear and rotating the same at different speeds, said means including a pair of gears movable endwise, independently sliding members for moving the last-mentioned gears endwise, said members being provided with opposing engaging means spaced apart from each other, and a member movable about an axis into and out of position to coact with the engaging means of either of the sliding members and movable along said axis for shifting the predetermined member, the last-mentioned member being movable into a position between said engaging means, substantially as and for the purpose set forth.

59. In combination in a transmission and speed-changing gearing, driving and driven members, a gear connected to the driven member for rotating the same, a pair of fixed rods spaced apart from each other, and means for connecting the driving member to the gear and rotating the gear at different speeds, said means including a pair of gears movable endwise, members slidable independently along the rods for moving the last-mentioned gears endwise, and means for shifting either of the sliding members, substantially as and for the purpose described.

60. The combination in a transmission and speed-changing gearing, driving and driven members, a gear connected to the driven member for rotating the same, a plurality of rods spaced apart from each other, and means for connecting the driving member to the gear and rotating the gear at different speeds, said means including a pair of gears movable endwise, members supported on two of the rods and movable along the axles thereof for shifting the last-mentioned gears endwise, said members being provided with opposing engaging means spaced apart from each other, and a member mounted on one of the rods arranged between said two of the rods, the member being movable about an axis into and out of position to coact with the engaging means of each of the sliding members and movable along said axis for shifting the predetermined sliding member, the last-mentioned member being movable into a position between said engaging means, substantially as and for the purpose specified.

61. In combination in a transmission and speed-changing gearing, driving and driven members arranged with their axes at an angle to each other, a casing comprising separable sections and provided with a partition forming a part of one of the sections of the casing and being removable therewith from another section of the casing, said partition and the opposing wall of the section of the casing removable therewith being provided with bearings for the driving member, and another section of the casing being provided with means for supporting the driven member, a plurality of rods supported by the partition and the opposing wall of the section of the casing provided with the partition, a gear connected to the driven member for rotating the same, and means for connecting the driving member and the gear and rotating the gear at different speeds, said means including a pair of gears movable endwise, members supported on two of the rods and movable along the axes thereof for shifting the last-mentioned gears endwise, said members being provided with opposing engaging means spaced apart from each other, and a member mounted on one of the rods arranged between said two of the rods, the member being movable about an axis into and out of position to coact with the engaging means of either of the sliding members and movable along said axis for shifting the predetermined sliding member, the last-mentioned member being movable into a position between said engaging means, substantially as and for the purpose set forth.

62. In combination in a transmission and speed-changing gearing, driving and driven members, a gear connected to the driven member for rotating the same, and means for connecting the driving member to the gear and rotating the gear at different speeds and in opposite directions, said means including an intermediate gear for effecting the reverse movement of the first-mentioned gear, a shaft for the intermediate gear, the shaft being movable endwise with said intermediate gear, an arm fixed relatively to the shaft, and means for actuating the arm, substantially as and for the purpose specified.

63. In combination in a transmission and speed-changing gearing, driving and driven members, a gear connected to the driven member for rotating the same, and means for connecting the driving member to the gear and rotating the gear at different speeds and in opposite directions, said means including an intermediate gear for effecting the reverse movement of the first-mentioned gear, a shaft for the intermediate gear, the shaft being movable endwise with said intermediate gear, an arm fixed relatively to the shaft, and a member movable about an axis into and out of position to coact with said arm and movable along said axis for shifting the arm and the intermediate gear, substantially as and for the purpose described.

64. In combination in a transmission and speed-changing gearing, a casing comprising separable sections and provided with a partition and with a passageway connecting the interiors of sections of the casing, the partition forming a part of one of the sections of the casing, driving and driven members in the casing, a gear connected to the driven member for rotating the same, and means for connecting the driving member to the gear and rotating the gear at different speeds and in opposite directions, said means including an intermediate gear for effecting the reverse movement of the first-mentioned gear, a shaft for said gear, the shaft being movable endwise, an arm fixed to the shaft, and a member movable about an axis into and out of position to coact with said arm, and movable along said axis for shifting said arm, shaft and intermediate gears, said member being supported by the partition and the opposing wall of the section of the casing provided with the partition, substantially as and for the purpose specified.

65. In combination in a transmission and speed-changing gearing, a casing comprising separable sections and provided with a partition and with a passageway connecting the interiors of the sections of the casing, the partition forming a part of one of the sections of the casing and being removable therewith from another section of the casing, a driven member supported by the section of the casing unprovided with the partition, a gear concentric with the driven member and extending through the passageway, a second gear arranged in the section of the casing provided with the partition, said gear coacting with the first-mentioned gear and being provided with a sleeve, a power-shaft extending through the second-mentioned gear and journaled at opposite sides thereof in the partition and the opposing wall of the section of the casing provided with the partition, said shaft having revoluble movement independently of the second-mentioned gear, a countershaft having its ends journaled in the partition and the opposing wall of the section of the casing provided with the countershaft, a third gear revoluble with the second-mentioned gear, a fourth gear revoluble with the sleeve and movable lengthwise thereof, coacting clutch-members respectively fixed to the power-shaft and the fourth-mentioned gear, a fifth gear revoluble with the driving member and arranged between the second-mentioned gear and the partition, said fifth gear being connected to the counter shaft, a plurality of gears mounted on the countershaft for coacting with the third and fourth-mentioned gears, one of said plurality of gears being fixed to the countershaft and another slidable lengthwise thereof, a pair of intermediate gears revoluble together and movable into mesh respectively with one of the gears revoluble with the first-mentioned gear and one of the gears on the countershaft, a shaft for the pair of intermediate gears, the endwise, a plurality of rods extending parallel to said shafts members supported on two of the rods and movable lengthwise of the axes thereof for shifting the last-mentioned gears endwise, said members being provided with opposing engaging means spaced apart, an intermediate gear for effecting the reverse movement of the first-mentioned gear, the intermediate gear being movable endwise, an arm for shifting the intermediate gear endwise, said arm having engaging means interposed between the opposing engaging means of the sliding members, and a member mounted on one of the rods arranged between said two of the rods, the member being movable about an axis into and out of position to coact with the engaging means of either of the sliding members or the arm connected to the intermediate gear, and being movable along said axis for shifting the part provided with the predetermined engaging means, substantially as and for the purpose described.

66. In a gearing, the combination of a driving member, a sectional driven member, an equalizing device associated with the driven member and including an element concentric with said driven member and movable axially thereof and provided with an internal bearing surface, an opposing bearing movable axially of the driven member with the said element, a part carrying the opposing bearing and adjustably mounted to move axially of the driven member, and power transmitting means between said element and the driving member.

67. In a gearing, the combination of a driving member, a driven member including sections, an equalizing device connecting the sections of the driven member and the driving member and comprising a part concentric with the driven member, antifriction bearings for said part, the bearings being spaced apart and said equalizing device and bearings being movable together axially, a sleeve encircling the driven member and carrying one of the anti-friction bearings, and being adjustable lengthwise of the driven member for moving the equalizing device and the bearings axially, a support for the other antifriction bearing, a thrust bearing engaging a part of the other antifriction bearing, and means for connecting the driving member and the equalizing device.

68. In combination, in a transmission and speed changing gearing, driving and driven members, a gear connected to the driven member for rotating the same, and means for connecting the driving member to the gear and rotating the gear at different speeds and in opposite directions, said means including an intermediate gear for effecting the reverse movement of the first-mentioned gear, an endwise shiftable shaft carrying said intermediate gear, an arm connected to said shaft intermediate the ends thereof and extending radially therefrom, and a part movable about an axis into and out of position to coact with said arm and movable lengthwise of said axis for shifting the arm and the intermediate gear.

69. In combination in a transmission and speed changing gearing, a driving member, a gear shiftable axially thereof, a countershaft, a second gear shiftable axially of the same, a third shaft located in a plane below said driving member and countershaft, a reversing gear associated with the third shaft, a shiftable member movable about and lengthwise of an axis, devices associated respectively with the gear of the driving and countershaft shafts and having parts extending into the path of movement of said shiftable member for interlocking therewith, and a part for controlling the reversing gear extending between the aforesaid parts and into the path of movement of said shiftable member for interlocking with the same when out of engagement with the aforesaid parts.

70. In combination, compensating mechanism, driven shaft sections associated therewith, a casing section housing portions of the compensating mechanism and the driven shaft sections, and having an opening through one side for permitting access to the compensating mechanism and the removal of said mechanism, a driving member, a gear thereon, a countershaft, a gear carried thereby, a reversing shaft, a gear thereon, means for shifting said gears and a second casing section housing said driving member and gear, countershaft and gear and reversing shaft and gear, and said gear shifting mechanism, said second casing section covering the opening in the first-named casing section and having openings for the removal of said shafts housed thereby, said second casing section having an opening for the removal of the gears and shifting mechanism housed thereby, and a cover for the last-named opening.

In testimony whereof I have hereunto signed my name, in the presence of two attesting witnesses, at Syracuse, in the county of Onondaga, in the State of New York, this 23rd day of April, 1908.

ALEXANDER T. BROWN.

Witnesses:
S. DAVIS,
E. K. SEEMILLER.